E. ANDREWS & W. TUCKER.

Manufacture of Matches.

No. 6,276. Reissued Feb. 9, 1875.

Witnesses:-
Frank H. Jordan
Charles E. Clifford

Andrew Spring,
Samuel E. Spring,
James C. Jordan,
By their atty,
Wm. Henry Clifford Assignees of Andrew & Tucker

UNITED STATES PATENT OFFICE.

EMERY ANDREWS AND WILLIAM TUCKER, OF FISKEDALE, MASSACHUSETTS, ASSIGNORS, BY MESNE ASSIGNMENTS, TO ANDREW SPRING, SAMUEL E. SPRING, AND JAMES C. JORDAN, OF PORTLAND, MAINE.

IMPROVEMENT IN THE MANUFACTURE OF MATCHES.

Specification forming part of Letters Patent No. 63,197, dated March 26, 1867; reissue No. 6,276, dated February 9, 1875; application filed October 1, 1871.

*To all whom it may concern:*

Be it known that EMERY ANDREWS and WILLIAM TUCKER, of Fiskedale, in the county of Worcester and State of Massachusetts, have invented certain new and useful Improvements in the Manufacture of Matches; and we do hereby declare that the following is a full, clear, and exact description thereof, that will enable others skilled in the art to which it appertains to make and use the same, reference being had to the accompanying drawings and to the letters of reference marked thereon, which form a part of this specification.

Figure 1:
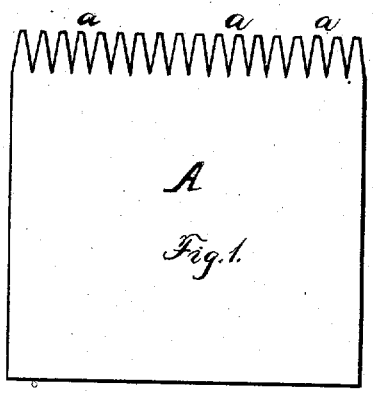
Figure 2:
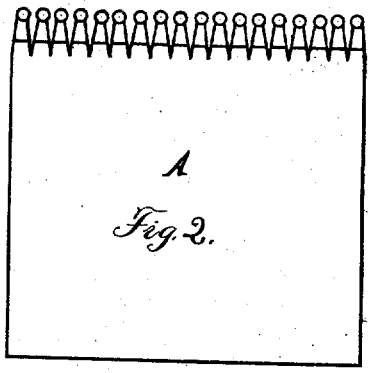

Figure 1 represents a plan of one of the cards. Fig. 2 is a similar view of the same after dipping.

Same letters show like parts.

The object of this invention is to produce certain improvements in the manufacture of matches.

In order to effect this purpose the cards are prepared equal in width to the length of the matches to be produced, and of any desirable length. One edge of each of these cards is then scalloped or notched, so as to form a notched unslit card, and so as to form along one edge of the card a series of points or teeth, which can be dipped in the sulphur and in the explosive compound. This is done to permit of the end of the card being dipped in the sulphur and explosive compounds without connecting the several points together by the explosive compound. If the notching were not used this compound would form a continuous, or nearly continuous, line on the edge of the card.

It is therefore necessary to this manufacture to have the card so scalloped or notched that each of the teeth *a* can separately receive the sulphur and the explosive compound.

After the cards have been dipped they may be exposed to the action of suitable cutters to slit the card into splints.

A represents one of our notched cards, prepared for the subsequent steps of dipping and slitting. One edge of this card is provided with teeth, *a*, which are produced by means of dies or saws, or in any other suitable manner. Thus prepared, the card is then submitted to the subsequent operations of dipping in the sulphur and in the match compound, and slitting, and the matches are ready for use.

By preparing the cards as described, when the explosive compound is applied to the points previous to the cutting of the cards, the cutters will not come into contact with such compound, and all danger of ignition is avoided.

By dipping the matches before cutting, the time required for putting the cut matches into racks and dipping them in that state is saved.

In carrying out this invention it will be perceived that we are enabled to separate the matches by driving the card through stationary knives, for the reason that the points of the splints to which the compound is applied stand in, or nearly in, the center of the matches, so that there is no danger of the composition being ignited by the knives; and by the formation of the notches in the card the proper recesses for the knives to enter the card is provided, as well as the proper points on which to apply the match compound.

By forming the card with shallow notches, in the manner represented, the matches can be cut therefrom by suitable cutters, either with or against the grain of the wood, the separating or disjoining operation being entirely performed by the knife, which gives a symmetrical and smooth appearance to the matches, and enables a much better article to be produced than under the old process of manufacturing matches in the form of cards, in which the card is cut nearly through to enable the matches to be easily broken therefrom when required for use.

What is claimed as the invention of EM-

ERY ANDREWS and WILLIAM TUCKER is as follows:

1. In the manufacture of matches, the notched or scalloped and unslit match-card, as herein described, and shown in Fig. 1.

2. Notching and dipping the cards preparatory to cutting the matches therefrom, substantially as and for the purposes specified.

In testimony that we claim the foregoing we have hereunto set our hands this 28th day of September, 1874.

ANDREW SPRING.
SAMUEL E. SPRING.
JAMES C. JORDAN.

Witnesses:
F. A. SPRING,
WM. B. SPRING.